UNITED STATES PATENT OFFICE.

WALLACE PATTEN COHOE AND EDWARD CAREY FOX, OF TORONTO, ONTARIO, CANADA, ASSIGNORS OF ONE-THIRD TO THE WILLIAM DAVIES COMPANY, LIMITED, OF TORONTO, CANADA, A CORPORATION OF CANADA.

SAUSAGE AND CASING THEREFOR.

1,070,776.  Specification of Letters Patent.  Patented Aug. 19, 1913.

No Drawing.  Application filed November 13, 1912.  Serial No. 731,089.

*To all whom it may concern:*

Be it known that we, WALLACE PATTEN COHOE, chemist, and EDWARD CAREY FOX, manufacturer, both residing in the city of Toronto, county of York, Province of Ontario, Dominion of Canada, and citizens of the Dominion of Canada, have invented certain new and useful Improvements in Sausage and Casings Therefor; and we do hereby declare the following to be a full, clear, and exact description of the invention, such as will enable others skilled in the art to which it appertains to make and use the same.

Prior to the present invention, it has been generally customary to make the skin covering or casing of sausages from the intestines of sheep, hogs and oxen. In some instances, for certain kinds of bologna sausages, it has also been the custom to use thin cotton bagging or parchment paper as a casing, the casing in such instance, not being intended for consumption. So also, it has been proposed to employ as a casing cotton fabric impregnated with gelatin hardened by alum, mainly for the purpose of strengthening the casing and protecting its contents from mold.

The present invention is designed to afford a satisfactory substitute for these several types of casing, and is appropriate for use in the manufacture of sausages generally, including not only those which are intended for boiling, frying and broiling, but also for those of the bologna kind, that is to say, those which are intended to be sliced cold.

The main purpose of the invention is to provide a casing which has all of the necessary strength to be efficiently filled by the sausage machine, and which is thin, flexible and pliable, as required of such products. Furthermore, the casing is edible, in the sense of not irritating the digestive organs, and, indeed, it is likewise, of itself, capable of hydrolysis to a greater or less extent, by the digestive juices.

Broadly stated, the improved product consists of a sausage or bologna casing made from cellulose hydrate which has been so dried and consequently so strengthened as to prepare it for the reception of its sausage meat contents. With the cellulose hydrate may likewise be incorporated, if desired, any proteins (such as blood fibrin) whose physical properties are suitable for the purpose.

In carrying out the invention, the casing is made in the form of a thin walled tube, sufficiently strong to be used for the purpose intended and of appropriate dimensions, that is to say, of any suitable length, the wall thickness preferably corresponding quite closely to that of the ordinary casing, although some slight latitude may be allowed in this regard. The tube may be formed in any suitable way, as, for instance, by coating a hollow mandrel with a solution of viscose of suitable thickness, passing steam through the mandrel until the coating has become thoroughly hardened, after which the coating is wetted, in which condition it may be removed without difficulty from the mandrel. It may then be washed, dried, and softened as hereinafter described.

The cellulose hydrate used for the purpose may be made in accordance with any suitable method of production. For instance, cotton may be nitrated and dissolved in a suitable solvent, and a film prepared therefrom which may be subsequently denitrated, with the consequent production of cellulose hydrate. Or the solution of cellulose hydrate may be made by the well-known zinc chlorid reaction, with the ultimate production of cellulose hydrate by well-known means. So also, the cellulose hydrate may be made by the well-known cupra-ammonium reaction. It is preferred, however, to produce the cellulose hydrate according to the viscose reaction, mainly for the reason that it is at present probably the cheapest method of production and because of the ease of carrying out the reaction, the final product being, as in the other instances cited, cellulose hydrate. In addition to the methods thus referred to, other methods for producing cellulose hydrate, as, for instance, by the employment of strong acids, may be used, and, in fact, as hereinbefore indicated, insofar as the production of the cellulose hydrate itself is concerned, the invention is not limited to any specific method of manufacture, but contemplates broadly the employment of cellulose hydrate, however produced, as the material from which the casing is to be made.

In accordance with our preferred practice, the tube of cellulose hydrate is prepared under aseptic conditions. In drying the cellulose hydrate, the dehydration is designed in the first place to give to the tube the requisite strength to prepare it for the reception of its sausage meat contents. The main purposes of the invention will be satisfied by carrying the dehydration to this extent, and, within the meaning of this specification, the product may then be regarded as "dried" cellulose hydrate, even though the drying is not carried further. It is preferred, however, not only to dry it sufficiently to give it the strength desired, but to dry it so thoroughly as to prevent it from being acted upon by ferments or bacteria, so that it can be kept a long period of time without deterioration, for the uses intended. In this preferred condition, with the water of hydration substantially driven off, the casing is probably converted into substantially pure cellulose, which represents its maximum efficiency and availability for the purposes of the invention, and it will, of course, be understood that, in the sense of the present specification, this preferred maximum degree of dehydration is likewise included.

In order to soften the tube, we may impregnate it with glycerin, fats, glucose, fatty acids, and the like. As thus softened it is almost identical in appearance with the casings already in use, and this treatment likewise prevents irregularity of shrinkage of the casings.

On account of its purity, and the aseptic conditions under which it can be prepared, the casing satisfies proper sanitary conditions and is not subject to the difficulty of preservation from putrescence when kept in storage for a long period of time, which difficulty is characteristic of ordinary casings. So also, the casing although of vegetable material, has its cellular structure entirely destroyed and is absolutely non-fibrous, in contradistinction to the cotton fabric and the parchment paper hereinbefore referred to as sometimes employed for making casings of bologna sausages.

Having thus described our invention, what we claim is:

1. A casing for sausages, comprising a thin-walled tubular covering of dried cellulose hydrate for enveloping and inclosing the sausage meat filling.

2. A casing for sausages, comprising a thin-walled tubular covering of dried cellulose hydrate for enveloping and inclosing the sausage meat filling, said covering being impregnated with a supplemental softening material for increasing its pliability and elasticity.

3. A casing for sausages, comprising a thin-walled tubular covering of dried cellulose hydrate for enveloping and for inclosing the sausage meat filling, said covering being impregnated with glycerin.

4. A casing for sausages, comprising a thin-walled tubular covering of non-fibrous edible dried cellulose hydrate for enveloping and inclosing the sausage meat filling.

5. A casing for sausages, comprising a thin-walled tubular covering of non-fibrous edible dried cellulose hydrate for enveloping and inclosing the sausage meat filling, said covering being impregnated with a supplemental softening material for increasing its pliability and elasticity.

6. A sausage, provided with a thin-walled tubular casing of dried cellulose hydrate enveloping and inclosing the sausage-meat filling.

7. A sausage, provided with a thin-walled tubular casing of dried cellulose hydrate enveloping and inclosing the sausage-meat filling, said covering being impregnated with a supplemental softening material for increasing its pliability and elasticity.

8. A sausage, provided with a thin-walled tubular covering of dried cellulose hydrate enveloping and inclosing the sausage-meat filling, said covering being impregnated with glycerin.

In testimony whereof we affix our signatures, in presence of two witnesses.

WALLACE PATTEN COHOE.
EDWARD CAREY FOX.

Witnesses:
D. S. TOUELL,
H. M. CHRISTMAN.